Patented Sept. 12, 1944

2,357,917

UNITED STATES PATENT OFFICE 2,357,917

RESIN EMULSIONS

Ashworth N. Stull, Newark, and William L. Abramowitz, Lakewood, N. J., assignors to National Oil Products Company, Harrison, N. J., a corporation of New Jersey No Drawing. Application June 13, 1940, Serial No. 340,318

2 Claims. (Cl. 106—144)

This invention relates to the preparation of resin emulsions, more particularly to the preparation of resin emulsions suitable for sizing fibrous materials or for applying permanent finishes thereto.

As is well known, resin coatings have been applied to materials such as paper and the like by treating the material with an emulsion of the resin, and then removing the aqueous medium so as to leave a coating of the resin on the material. In line with this use, it has been proposed to employ such resin emulsions for sizing fibrous materials such as textiles, paper, leather, etc. While this proposal has met with some degree of success, experience has shown that by far the majority of these resins are not suitable for application to white materials such as undyed textiles or paper, because of the fact that upon aging these resins tend to yellow; thus, for example, emulsions of resinous materials such as ester gum have not been successfully employed because of this factor. The nature of the yellowing phenomenon is not completely understood and it has been a problem with which the industry has been confronted for many years.

Another disadvantage incidental to the use of many types of resin emulsions is that the resins contained therein may not be completely compatible with plasticizers or other resins of different types, and hence coatings produced by such resin emulsions may be relatively inflexible or commercially unacceptable.

It is an object of this invention to provide emulsions which may be applied to fibrous materials without causing the development of undesirable yellowing upon aging.

It is a further object of this invention to provide resin emulsions which may be applied to fibrous materials so as to produce permanent finishes thereon.

Another object of this invention is to provide resin emulsions capable of furnishing fibrous materials with highly flexible, resistant coatings.

We have made the important discovery that emulsions of hydrogenated ester gums possess properties which make them eminently suitable for use in sizing or applying permanent finishes to fibrous materials. In the first place, such emulsions, we have found, may be readily applied to all types of fibrous materials in order to produce coatings thereon which are completely resistant to yellowing upon aging under all conditions met with in normal use. In the second place, hydrogenated ester gum is completely compatible with the majority of plasticizers and may be blended with other types of resinous materials, so that emulsions having widely different characteristics may thus be prepared. By the use of appropriate emulsifiers, it is possible to obtain hydrogenated ester gum emulsions which may be applied to fibrous materials in order to produce highly permanent finishes thereon; this feature is extremely important, since finishes which are relatively permanent, and which do not possess the undesirable characteristics of yellowing with age, have not been successfully produced from a commercial standpoint. Hydrogenated ester gums may be easily emulsified in aqueous bodies with the aid of readily available emulsifiers, so that the products of our invention may be easily and economically manufactured. Because of these properties it will be evident that the hydrogenated ester gum emulsions of our invention fulfill an important demand in the textile and allied industries.

The hydrogenated ester gums employed in the manufacture of the emulsions of our invention are solid materials, usually hard and brittle, and may be prepared either by hydrogenating rosin and then reacting the hydrogenated product with glycerin, methanol, ethanol, diethylene glycol, or some other aliphatic alcohol, or by first reacting rosin with the alcohol to form ordinary ester gum and then subjecting the ester gum to hydrogenation. They may also be prepared by subjecting rosin to elevated temperatures, preferably in the presence of steam or a suitable hydrogenation catalyst such as palladium, to cause substantially all the rosin to become disproportionated, and then reacting the disproportionated rosin with an aliphatic alcohol; these hydrogenated ester gums may also be prepared by first esterifying the rosin and then disproportionating the esterified rosin. Products obtained by hydrogenating the disproportionated materials may also be used. The term "hydrogenated ester gum" is thus intended to include not only those products obtained by hydrogenating ester gums, but also any of the hydrogenated ester gum-containing materials, the preparation of which is hereinabove described. The degree of hydrogenation may vary somewhat, but we prefer to employ a hydrogenated ester gum having an iodine value between about 60 and about 90; however, it is to be understood that ester gums hydrogenated to a somewhat greater or lesser degree may be employed, if desired. The melting point of the hydrogenated ester gums may likewise vary somewhat and depends to a great extent upon the degree of hydrogenation; generally, however, hydrogenated ester gums having a melting point between about 80 and about 90 are suitable. The hydrogenated ester gums are soluble in most coal tar and petroleum solvents. From its properties and method of preparation it is evident that in spite of its name, hydrogenated ester gum is actually a resin and not a gum.

The emulsions of our invention may be prepared in accordance with any of the several methods of emulsification known to the art. We prefer, however, to prepare these emulsions by dissolving the hydrogenated ester gum in a suitable solvent therefor, e. g. xylol, and then agitating this solution with an aqueous body in the presence of a suitable emulsifier. In some cases, such as when solubilized casein or polyvinyl alcohol is employed as the emulsifier, it may be desirable to first form an emulsion of the aqueous body in the resin solution, and then invert the emulsion by the gradual addition of water, in order to produce emulsions more readily dilutable with water. Emulsification of the resin in the aqueous medium may be accomplished at any suitable temperature, preferably at slightly elevated temperatures, and in any type of equipment which may be convenient. The resin solution added to the aqueous body in accordance with our invention may contain other materials capable of suitably modifying the properties of the emulsion. Thus, for example, other resins such as the alkyd resins or hydrogenated cumarone and indene resins may be included in order to enhance the feel of the fibrous materials ultimately treated. Plasticizers such as dibutyl phthalate, tricresyl phosphate and the like may also be incorporated in the solution, if desired. Metallic soaps, e. g. aluminum stearate, when incorporated with the hydrogenated ester gum often lend desirable characteristics to the emulsions obtained.

The emulsifier employed in accordance with our invention may be a soap, a sulfonated oil, polyvinyl alcohol, solubilized casein or a salt of a monoamide formed by the reaction of ethanol ethylene diamine and a higher fatty acid compound such as oleic or stearic acid or their esters; other emulsifiers known to the art may also be employed, if desired. The selection of the particular emulsifier to be employed is controlled to some extent by whether or not it is desired to obtain emulsions capable of yielding permanent finishes when applied to fibrous materials. As is well known, a permanent finish is one which is not discharged from the fibrous materials upon contact with alkaline cleansing agents; accordingly the term "permanent finish" is employed throughout the specification and claims to denote a finish having such properties. Thus if such finishes are desired, emulsifiers should be employed which are either insoluble in alkalies or which may be inactivated upon the fibrous materials after application thereto. One of the preferred emulsifiers employed in the preparation of permanent finishes in accordance with this invention is solubilized casein, since this material may be inactivated after the emulsion has been applied to the fibrous material by heating the material to temperatures of around 70° or 80° C. The fatty amides herein above referred to may also be employed in this connection since they are insoluble in alkali. However, it is to be understood that this invention is not limited to the use of resin emulsions capable of producing permanent finishes, since emulsifiers such as a soap or a sulfonated oil are capable of yielding emulsions having valuable sizing properties.

The amount of resin emulsified in the aqueous body may vary widely depending upon the use to which the emulsion is to be put. Thus, for example, if it is desired to prepare resin emulsions which are to be sold to a consumer for use in treating textiles, the emulsions as sold may contain as high as 40 or 50% resin; such emulsions may then be diluted to the proper concentration before use. The amount of resin contained in the emulsions as they are applied to fibrous materials depends to some extent upon the particular material to be treated; thus, for example, an emulsion containing about 7% hydrogenated ester gum is suitable for treating cotton, whereas materials such as khaki and rayon may suitably be treated with emulsions containing only 2 to 4% hydrogenated ester gum.

The emulsions of our invention may be applied to fibrous materials in accordance with any of the many suitable ways known to the art. When applying a size or a permanent finish to textile materials, the emulsions may be applied thereto by means of quetsches, mangles, padders or other suitable means. The textile materials thus treated may then be dried by the application of heat or any other suitable method. If it is intended to produce permanent finishes upon the textile materials with the aid of emulsions prepared with solubilized casein, calendering of the cloth will ordinarily raise the temperature sufficiently high to inactivate the casein. Paper may be suitably sized with the emulsions of our invention by introducing the emulsion into the beater, and then precipitating the resin on the fibres with an acidic material such as alum. Leather may be sized with the resin emulsions of our invention by agitating the leather with the emulsions in a drum.

The fibrous materials treated in accordance with our invention show no tendency to yellow even after prolonged aging at elevated temperatures or exposure to sunlight. This feature of our invention is particularly important in connection with the undyed or light-colored textiles or paper, since the yellowing which normally occurs with the use of other resins heretofore employed often renders such materials unfit for use. The treated materials are extremely pliable and possess no undesirable odors of any kind. Our novel emulsions also tend to impart a non-slip finish to the material treated. In addition, textile materials treated with emulsions prepared in accordance with our invention possess the important advantage of taking up an extremely small amount of chlorine during bleaching, so that such materials do not suffer the substantial loss in tensile strength, which is ordinarily incidental to the bleaching operation.

The following examples are illustrative of our invention; amounts are given in parts by weight.

*Example I*

20 parts of casein were suspended in 100 parts of water. 2 parts of a 28% ammonia solution and 1 part of borax were then dissolved in 360 parts of water and a small amount of sodium phenyl phenate was added to the solution. The ammonia-borax solution was then mixed with the casein suspension and heated slightly to form the solubilized casein emulsifier; the sodium phenyl phenate acted as a stabilizer for the casein. 450 parts of hydrogenated ester gum having an iodine value of about 70 and a melting point between 87° and 90° C. were then mixed with 50 parts of xylol and the mixture gradually added to the solubilized casein solution with constant agitation at a temperature of about 50° C. The resulting product was then slowly mixed with additional water until phase inversion took place.

The above emulsion was diluted with water so as to form an emulsion containing about 7% hydrogenated ester gum. This diluted emulsion was then applied with a quetsch to cotton cloth, and the cloth dried by heating to a temperature of about 70° C. This cloth was then subjected to aging tests by subjecting it to elevated temperatures and by exposing it to sunlight; in neither case did any undesirable yellowing occur. Furthermore, the finish upon the cotton cloth was substantially permanent, as is evidenced by the fact that scouring the cloth with an alkaline soap solution did not appreciably affect the character of the finish.

Example II 5 parts of the monoamide formed by reacting the glyceride of stearic acid with ethanol ethylene diamine, 35 parts of hydrogenated ester gum having an iodine value of about 70 and a melting point between 87° and 90° C., and 5 parts of the hydrocarbon solvent known as "Stoddard solvent" were heated to 70° C. to form a clear mix. 1 part of glacial acetic acid was then dissolved in 64 parts of water, the solution heated to 70° C. and gradually added to the hot resin mix with agitation. The resulting product was a stable emulsion.

This emulsion was diluted with water to form an emulsion containing about 7% resin and then applied to cotton cloth with a quetsch. The resulting cloth had all the desirable properties of the cloth treated in accordance with Example I.

Example III 35 parts of casein were suspended in 175 parts of water. 4 parts of a 28% ammonia solution and 1 part of borax were then dissolved in 280 parts of water and a small amount of sodium phenyl phenate was added to the solution. The ammonia-borax solution was then mixed with the casein suspension and heated slightly to form the solubilized casein emulsifier. 250 parts of hydrogenated ester gum having an iodine value of about 70 and a melting point between 87° and 90° C. and 150 parts of a glyceryl phthalate resin were mixed with 100 parts of xylol and the mixture slowly added to the casein solution with constant agitation at a temperature of about 50° C. The resulting emulsion was then slowly mixed with additional water until phase inversion took place. Cotton cloth, when treated with this emulsion diluted to 7% resin as described in Example I, was found to have an excellent, pliable, permanent finish.

Example IV 20 parts of hydrogenated ester gum having an iodine value of about 70 and a melting point between 87° and 90° C. and 5 parts of a glyceryl phthalate resin were mixed with 10 parts of xylol; this mixture was then added gradually with constant agitation to a solution of 2 parts of polyvinyl alcohol in 17 parts of water, the temperature of mixing being around 60° C. The resulting emulsion was then slowly mixed with water until phase inversion took place. The final emulsion was stable and could be diluted with water to form emulsions highly suitable for sizing textiles or for water-proofing paper.

Example V 15 parts of sodium oleate were dissolved in 40 parts of water. 40 parts of hydrogenated ester gum having an iodine value of about 70 and a melting point between 87° and 90° C. were then mixed with 5 parts of xylol and the solution added to the aqueous soap solution with constant agitation. The resulting emulsion was stable and could be diluted with water to form emulsions highly suitable for sizing textile materials or paper.

Example VI 40 parts of hydrogenated ester gum having an iodine value of about 70 and a melting point between 87° and 90° C. were mixed with 5 parts of xylol and the solution added to 15 parts of a 65% sulfated sperm oil solution with constant agitation. The resulting emulsion was then diluted with 40 parts of water, whereby a stable emulsion was formed which could be diluted with water to form emulsions highly suitable for sizing textile materials or paper.

It will be evident from the above description that the emulsions of our invention are capable of wide application throughout the textile and allied industries. Such emulsions may be used wherever it is desired to apply a resistant coating to fibrous materials, and are particularly useful in connection with the sizing or permanent finishing of white materials such as textiles, paper, or white leather. Hence our invention will be of great interest to those engaged in such industries.

In addition to the uses hereinabove mentioned, our resin emulsions may be used for other purposes. For example, they may be used as binders to cause finely divided materials such as mineral wool or ceramics to adhere suitably. They may be compounded with wood, paper, etc. and the compounds used for anti-squeak materials. Our resin emulsions may be modified by the inclusion of rosin, paraffin wax, etc. and employed for paper coating. In general it may be said that our emulsions may be used wherever resin emulsions find application.

Since certain changes in carrying out the above process and certain modifications in the compositions which embody the invention may be made without departing from its scope, it is intended that all matter contained in the above description shall be interpreted as illustrative and not in a limiting sense.

Having described our invention, what we claim as new and desire to secure by Letters Patent is:

1. An emulsion of a resinous body in an aqueous medium containing solubilized casein as an emulsifier, the predominant ingredient of said resinous body being a hydrogenated ester gum having an iodine value between about 60 and about 90 and a melting point not less than 80° C.

2. A process for applying a permanent finish to fibrous materials, which comprises contacting said materials with an aqueous emulsion of a resinous body in a medium containing solubilized casein as an emulsifier, the predominant ingredient of said resinous body being a hydrogenated ester gum having a melting point not less than 80° C., and heating the thus treated materials to a temperature between about 70° and about 80° C.

ASHWORTH N. STULL.
WILLIAM L. ABRAMOWITZ.